United States Patent
Wagner et al.

(10) Patent No.: US 10,564,946 B1
(45) Date of Patent: Feb. 18, 2020

(54) DEPENDENCY HANDLING IN AN ON-DEMAND NETWORK CODE EXECUTION SYSTEM

(71) Applicant: Amazon Technologies, Inc., Seattle, WA (US)

(72) Inventors: Timothy Allen Wagner, Seattle, WA (US); Bryan Nicholas Moffatt, Seattle, WA (US); Marc John Brooker, Seattle, WA (US); Robison Rodrigues dos Santos, Seattle, WA (US); Niranjan Jayakar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 15/841,143

(22) Filed: Dec. 13, 2017

(51) Int. Cl.
*G06F 9/44* (2018.01)
*G06F 8/41* (2018.01)

(52) U.S. Cl.
CPC .............. *G06F 8/433* (2013.01); *G06F 8/443* (2013.01)

(58) Field of Classification Search
CPC ....... G06F 2009/45562; G06F 9/45533; G06F 21/53; G06F 8/61; G06F 8/63
See application file for complete search history.

(56) References Cited

U.S. PATENT DOCUMENTS

| | | |
|---|---|---|
| 4,949,254 A | 8/1990 | Shorter |
| 5,283,888 A | 2/1994 | Dao et al. |
| 5,970,488 A | 10/1999 | Crowe et al. |
| 6,385,636 B1 | 5/2002 | Suzuki |
| 6,463,509 B1 | 10/2002 | Teoman et al. |

(Continued)

FOREIGN PATENT DOCUMENTS

| | | |
|---|---|---|
| EP | 2663052 A1 | 11/2013 |
| JP | 2002287974 A | 10/2002 |

(Continued)

OTHER PUBLICATIONS

Anonymous: "Docker run reference", Dec. 7, 2015, XP055350246, Retrieved from the Internet:URL:https://web.archive.org/web/20151207111702/https:/docs.docker.com/engine/reference/run/ [retrieved on Feb. 28, 2017].

(Continued)

*Primary Examiner* — Duy Khuong T Nguyen
(74) *Attorney, Agent, or Firm* — Knobbe, Martens, Olson & Bear, LLP

(57) ABSTRACT

Systems and methods are described for managing dependencies among code in an on-demand code execution system in a manner that enables efficient execution of the code. A user may generate a task on the system by submitting code, which may reference additional code on the system. The system can determine a dependency graph for the submitted code, and generate packages for the task based at least partly on the dependency graph. On receiving a request to execute the task, the system can provision an execution environment with the packages, and execute the code of the task. The packages may be selected based on analysis of the dependency graph, such that execution of the task on the on-demand code execution system is expected to satisfy a desired execution metric, which may include a maximum time to begin executing code of a task subsequent to receiving a request to execute the task.

17 Claims, 8 Drawing Sheets

(56) References Cited

U.S. PATENT DOCUMENTS

| | | |
|---|---|---|
| 6,523,035 B1 | 2/2003 | Fleming et al. |
| 6,708,276 B1 | 3/2004 | Yarsa et al. |
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,537,788 B2 | 1/2017 | Reque et al. |
| 9,575,798 B2 | 2/2017 | Terayama et al. |
| 9,588,790 B1 | 3/2017 | Wagner et al. |
| 9,596,350 B1 | 3/2017 | Dymshyts et al. |
| 9,600,312 B2 | 3/2017 | Wagner et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,073,974 B2 * | 9/2018 | Hwang ................ G06F 21/577 |
| 10,102,040 B2 | 10/2018 | Marriner et al. |
| 10,108,443 B2 | 10/2018 | Wagner et al. |
| 10,140,137 B2 | 11/2018 | Wagner |
| 10,162,672 B2 | 12/2018 | Wagner et al. |
| 10,162,688 B2 | 12/2018 | Wagner |
| 10,203,990 B2 | 2/2019 | Wagner et al. |
| 10,223,104 B2 * | 3/2019 | Rees ........................ G06F 8/71 |
| 10,248,467 B2 | 4/2019 | Wisniewski et al. |
| 10,277,708 B2 | 4/2019 | Wagner et al. |
| 10,303,492 B1 | 5/2019 | Wagner et al. |
| 10,353,678 B1 | 7/2019 | Wagner |
| 10,353,746 B2 | 7/2019 | Reque et al. |
| 10,365,985 B2 | 7/2019 | Wagner |
| 10,387,177 B2 | 8/2019 | Wagner et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0098154 A1 | 5/2004 | McCarthy |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |

(56) References Cited

U.S. PATENT DOCUMENTS

| | | |
|---|---|---|
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0174419 A1 | 7/2007 | O'Connell et al. |
| 2007/0199000 A1 | 8/2007 | Shekhel et al. |
| 2007/0220009 A1 | 9/2007 | Morris et al. |
| 2007/0255604 A1 | 11/2007 | Seelig |
| 2008/0028409 A1 | 1/2008 | Cherkasova et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0201711 A1 | 8/2008 | Amir Husain |
| 2008/0209423 A1 | 8/2008 | Hirai |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2010/0325727 A1 | 12/2010 | Neystadt et al. |
| 2011/0010722 A1 | 1/2011 | Matsuyama |
| 2011/0029970 A1 | 2/2011 | Arasaratnam |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0314465 A1 | 12/2011 | Smith et al. |
| 2011/0321033 A1 | 12/2011 | Kelkar et al. |
| 2012/0011496 A1 | 1/2012 | Shimamura |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0139152 A1* | 5/2013 | Chang .................. G06F 9/45545 718/1 |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | Mcgrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275376 A1 | 10/2013 | Hudlow et al. |
| 2013/0275958 A1* | 10/2013 | Ivanov .................... G06F 8/61 717/174 |
| 2013/0275969 A1 | 10/2013 | Dimitrov |
| 2013/0275975 A1 | 10/2013 | Masuda et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |

(56) References Cited

U.S. PATENT DOCUMENTS

| | | |
|---|---|---|
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault et al. |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0344736 A1 | 11/2014 | Ryman et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0072727 A1 | 3/2016 | Leafe et al. |
| 2016/0077901 A1 | 3/2016 | Roth et al. |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0124665 A1 | 5/2016 | Jain et al. |
| 2016/0140180 A1 | 5/2016 | Park et al. |
| 2016/0191420 A1 | 6/2016 | Nagarajan et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0301739 A1 | 10/2016 | Thompson |
| 2016/0350099 A1 | 12/2016 | Suparna et al. |
| 2016/0364265 A1 | 12/2016 | Cao et al. |
| 2016/0371127 A1 | 12/2016 | Antony et al. |
| 2016/0371156 A1 | 12/2016 | Merriman |
| 2016/0378554 A1 | 12/2016 | Gummaraju et al. |
| 2017/0060621 A1 | 3/2017 | Whipple et al. |
| 2017/0083381 A1 | 3/2017 | Cong et al. |
| 2017/0085447 A1 | 3/2017 | Chen et al. |
| 2017/0090961 A1 | 3/2017 | Wagner et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |
| 2018/0067841 A1 | 3/2018 | Mahimkar |
| 2018/0121245 A1 | 5/2018 | Wagner et al. |
| 2018/0143865 A1 | 5/2018 | Wagner et al. |
| 2018/0203717 A1 | 7/2018 | Wagner et al. |
| 2018/0275987 A1 | 9/2018 | Vandeputte |
| 2018/0309819 A1 | 10/2018 | Thompson |
| 2018/0373507 A1* | 12/2018 | Mizrahi .................. G06N 7/00 |
| 2019/0050271 A1 | 2/2019 | Marriner et al. |
| 2019/0073234 A1 | 3/2019 | Wagner et al. |
| 2019/0102231 A1 | 4/2019 | Wagner |
| 2019/0108058 A1 | 4/2019 | Wagner et al. |
| 2019/0155629 A1 | 5/2019 | Wagner et al. |
| 2019/0171470 A1 | 6/2019 | Wagner |
| 2019/0196884 A1 | 6/2019 | Wagner |
| 2019/0205171 A1 | 7/2019 | Brooker et al. |
| 2019/0227849 A1 | 7/2019 | Wisniewski et al. |

FOREIGN PATENT DOCUMENTS

| | | |
|---|---|---|
| JP | 2006-107599 A | 4/2006 |
| JP | 2007-538323 A | 12/2007 |
| JP | 2010-026562 A | 2/2010 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| WO | WO 2009/137567 A1 | 11/2009 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |

(56) References Cited

FOREIGN PATENT DOCUMENTS

| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Retrieved from the Internet, Jun. 26, 2016, URL : http://docs.aws.amazon.com/lambda/latest/dg/lambda-dg.pdf.

Balazinska et al., Moirae: History-Enhanced Monitoring, Published: 2007, 12 pages, Jan. 2007.

Ben-Yehuda et al., "Deconstructing Amazon EC2 Spot Instance Pricing", ACM Transactions on Economics and Computation 1.3, 2013, 15 pages.

Czajkowski, G., and L. Daynes, Multitasking Without Compromise: A Virtual Machine Evolution 47(4a):60-73, ACM Sigplan Notices—Supplemental Issue, Apr. 2012.

Das et al., Adaptive Stream Processing using Dynamic Batch Sizing, 2014, 13 pages, Nov. 2014.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013, Jan. 2013.

Hoffman, Auto scaling your website with Amazon Web Services (AWS)—Part 2, Cardinalpath, Sep. 2015, 15 pages.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Preliminary Report on Patentability in PCT/US2015/052810 dated Apr. 4, 2017.

International Search Report and Written Opinion in PCT/US2015/052838 dated Dec. 18, 2015.

International Preliminary Report on Patentability in PCT/US2015/052838 dated Apr. 4, 2017.

International Search Report and Written Opinion in PCT/US2015/052833 dated Jan. 13, 2016.

International Preliminary Report on Patentability in PCT/US2015/052833 dated Apr. 4, 2017.

International Search Report and Written Opinion in PCT/US2015/064071 dated Mar. 16, 2016.

International Preliminary Report on Patentability in PCT/US2015/064071 dated Jun. 6, 2017.

International Search Report and Written Opinion in PCT/US2016/016211 dated Apr. 13, 2016.

International Preliminary Report on Patentability in PCT/US2016/016211 dated Aug. 17, 2017.

International Search Report and Written Opinion in PCT/US2016/026514 dated Jun. 8, 2016.

International Preliminary Report on Patentability in PCT/US2016/026514 dated Oct. 10, 2017.

International Search Report and Written Opinion in PCT/US2016/026520 dated Jul. 5, 2016.

International Preliminary Report on Patentability in PCT/US2016/026520 dated Oct. 10, 2017.

International Search Report and Written Opinion in PCT/US2016/054774 dated Dec. 16, 2016.

International Search Report and Written Opinion in PCT/US2016/066997 dated Mar. 20, 2017.

International Search Report and Written Opinion in PCT/US/2017/023564 dated Jun. 6, 2017.

International Search Report and Written Opinion in PCT/US2017/040054 dated Sep. 21, 2017.

International Search Report and Written Opinion in PCT/US2017/039514 dated Oct. 10, 2017.

Amazon, "AWS Lambda: Developer Guide", Retrieved from the Internet, 2019, URL : http://docs.aws.amazon.com/lambda/ latest/dg/lambda-dg.pdf, 521 pages.

Bhadani et al., Performance evaluation of web servers using central load balancing policy over virtual machines on cloud, Jan. 2010, 4 pages.

Deis, Container, 2014, 1 page.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

Han et al., Lightweight Resource Scaling for Cloud Applications, 2012, 8 pages.

Kamga et al., Extended scheduler for efficient frequency scaling in virtualized systems, Jul. 2012, 8 pages.

Kato, et al. "Web Service Conversion Architecture of the Web Application and Evaluation"; Research Report from Information Processing Society, Apr. 3, 2006.

Kazempour et al., AASH: an asymmetry-aware scheduler for hypervisors, Jul. 2010, 12 pages.

Kraft et al., 10 performance prediction in consolidated virtualized environments, Mar. 2011, 12 pages.

Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.

Meng et al., Efficient resource provisioning in compute clouds via VM multiplexing, Jun. 2010, 10 pages.

Merkel, "Docker: Lightweight Linux Containers for Consistent Development and Deployment", Linux Journal, vol. 2014 Issue 239, Mar. 2014, XP055171140, 16 pages.

Monteil, Coupling profile and historical methods to predict execution time of parallel applications. Parallel and Cloud Computing, 2013, <hal-01228236, pp. 81-89.

Sakamoto, et al. "Platform for Web Services using Proxy Server"; Research Report from Information Processing Society, Mar. 22, 2002, vol. 2002, No. 31.

Stack Overflow, Creating a database connection pool, 2009, 4 pages.

Tan et al., Provisioning for large scale cloud computing services, Jun. 2012, 2 pages.

Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.

Wu et al., HC-Midware: A Middleware to Enable High Performance Communication System Simulation in Heterogeneous Cloud, Association for Computing Machinery, Oct. 20-22, 2017, 10 pages.

Yamasaki et al. "Model-based resource selection for efficient virtual cluster deployment", Virtualization Technology in Distributed Computing, ACM, Nov. 2007, pp. 1-7.

(56) References Cited

OTHER PUBLICATIONS

Yue et al., AC 2012-4107: Using Amazon EC2 in Computer and Network Security Lab Exercises: Design, Results, and Analysis, 2012, American Society for Engineering Education 2012.
Extended Search Report in European Application No. 15846932.0 dated May 3, 2018.
Extended Search Report in European Application No. 15847202.7 dated Sep. 9, 2018.
Extended Search Report in European Application No. 15846542.7 dated Aug. 27, 2018.
International Preliminary Report on Patentability in PCT/US2016/054774 dated Apr. 3, 2018.
International Preliminary Report on Patentability in PCT/US2016/066997 dated Jun. 26, 2018.
International Preliminary Report on Patentability in PCT/US/2017/023564 dated Oct. 2, 2018.
International Preliminary Report on Patentability in PCT/US2017/040054 dated Jan. 1, 2019.
International Preliminary Report on Patentability in PCT/US2017/039514 dated Jan. 1, 2019.

* cited by examiner

DEPENDENCY HANDLING IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
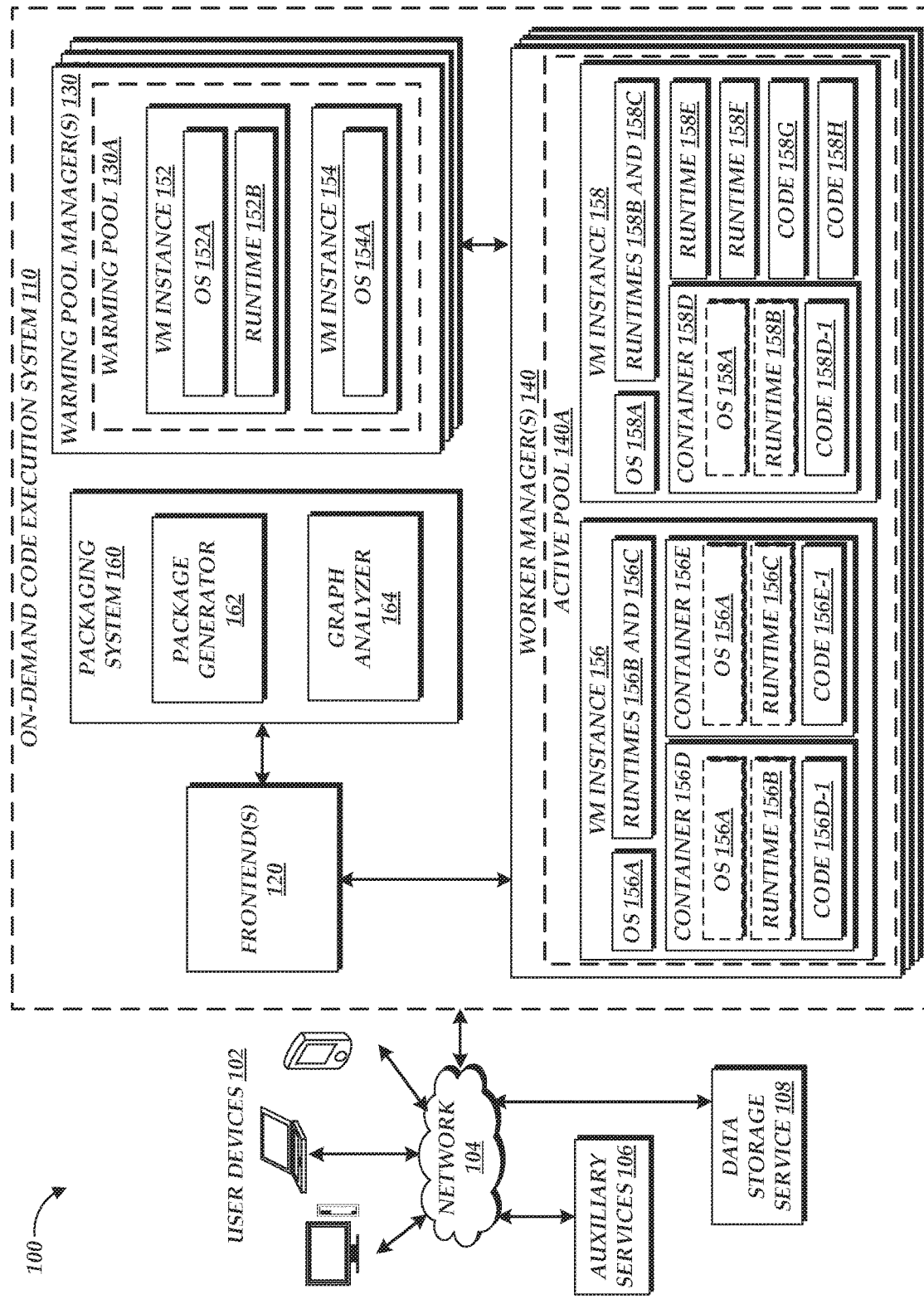
FIG. 1 is a block diagram depicting an illustrative environment in which an on-demand code execution system can operate to execute tasks corresponding to code, which may be submitted by users of the on-demand code execution system, and to enable handling of dependencies between multiple code objects that may be submitted by different users.

Generally described, aspects of the present disclosure relate to an on-demand code execution system. The on-demand code execution system enables rapid execution of code, which may be supplied by users of the on-demand code execution system. The on-demand code execution system further enables such code to depend from other code on the on-demand code execution system, potentially submitted by other users, and for such dependencies to be resolved in a manner that facilitates rapid execution of the code. Specifically, embodiments of the present disclosure enable the on-demand code execution system to resolve dependencies of code submitted to the environment, and to generate one or more packages containing the code or it's dependencies, which packages may facilitate execution of the code on the on-demand code execution system. The number and content of the packages generated may be selected to facilitate rapid execution of the code on the on-demand code execution system, taking into account factors such as latency required to initiate retrieval of the packages, time required to transfer the packages given bandwidth availability, and reusability of packages between multiple code executions on the on-demand code execution system. In one embodiment, graph analysis may be used to analyze dependencies of multiple items of submitted code, in order to generate packages usable by one or more of those items.

As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

In accordance with embodiments of the present disclosure, the on-demand code execution system may enable a task to reference additional code that exists within the on-demand code execution system separately from the code of the task. This additional code may represent, for example, libraries, runtimes, software development kits (SDKs), drivers, frameworks, or other code, including source code or machine code, used to facilitate execution of the task. As used herein, a collection of code (including one or more libraries, software development kits (SDKs), drivers, frameworks, runtimes, code of a task, etc.) will be referred to as a "code object." Within the on-demand code execution system, each code object may be associated with a universal resource identifier (URI) or other identifier uniquely identifying the code object. Thus, rather than being required to manually submit a code object with the code of a task, a user may simply reference a URI of the code object within metadata related to the task. Thereafter, on execution of the task within a computing device of the on-demand code execution system, the on-demand code execution system can cause the referenced code object to be provisioned onto the computing device, thus enabling use of the code object during execution of the task. Illustratively, if a user desires to execute a task whose code depends from the "math.io" library of a developer "MathLibs," the user may be enabled to reference within metadata of the task an identifier such as "mathlibs::public::mathio." During execution of the task, the on-demand code execution system may cause a code object corresponding to the "math.io" library to be loaded into an execution environment for the task, thus enabling the code of the task to reference the math.io library. In some embodiments, additionally or alternatively to globally unique identifiers, scoped identifiers may be used to identify dependency code objects. For example, users may be enabled to reference code objects by an identifier unique to their account, or code objects within a collection of code objects may be enabled to reference other code objects in the collection based on an identifier unique within that collection of code objects.

In some instances, the on-demand code execution system may be configured to execute tasks rapidly, such as in under 50 ms. The use of dependency references may inhibit this rapid execution, as it may take significant time to resolve dependencies and provision an execution environment with code objects of those dependencies. For example, consider a task whose code references a first dependency, which in turn references a second dependency, etc. Illustratively, consider each request to retrieve a code object for a dependency introduces a latency of 5 ms (beyond the time required to actually transfer the code object into the execution environment of the task). In such a case, a dependency chain of only 5 levels would require 25 ms to properly provision the execution environment (half the desired total time of execution).

To reduce the introduction of excessive latency, the on-demand code execution system may be configured to generate a dependency graph for a task, and to generate one or more packages for the task, each of which includes multiple code objects related to the task. In one embodiment, on submission of a task, the on-demand code execution system may generate a dependency graph for the task, and package the code of the task, along with all code objects on which that code depends, into a single package. Thus, execution of the task may require provisioning of the execution environment with the package, rather than separately retrieving each dependency object. Including of the task code and all dependency data objects within a single package can thus significantly decrease execution time of the task, by reducing latency introduced when separately retrieving multiple dependency code objects. In this manner, users may be enabled to include code objects by reference (e.g., rather than submitting them with task code), without impacting execution speed on the on-demand code execution system.

In some instances, generation of a separate package for each task on the on-demand code execution system, including all dependency code objects for the task, may require large amounts of storage space on the on-demand code execution system (e.g., as each task dependency to a data object would cause the data object to be replicated into a package for the task). Moreover, the duplication of data objects may unnecessarily slow operation of the on-demand code execution system, due to the additional time needed to transfer potentially duplicative information. For example, where two tasks have different code, but share a dependency chain, it may be possible to utilize the shared dependency chain to reduce the need to transfer duplicative data. For example, two execution environments may be located on a common machine, and the data objects of the dependency chain may be transferred to the common machine only once (and thereafter either locally duplicated or commonly accessed). However, if each task is included within a package containing its entire dependency chain, the on-demand code execution system may be required to transfer the package of each task to the common machine, thus resulting in duplicative transfer of the common dependency chain and slowing operation of the on-demand code execution system.

To address this problem, embodiments of the present disclosure are enabled to conduct graph analysis on dependency graphs of tasks within the on-demand code execution system, and to generate one or more packages for the tasks that both maintain acceptable levels of latency when provisioning an environment to execute the task and that aim to reduce duplication of data within the on-demand code execution system, potentially reducing execution time of tasks by reducing time required to duplicate data. Operation of the on-demand code execution system to conduct graph analysis is described in more detail below.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the limited nature of compute resources with which to execute code, the latencies required to transfer information between computer networks, and the inefficiencies caused by duplication of data. These technical problems are addressed by the various technical solutions described herein, including the use of code object identifiers to identify dependencies for task code, and the implementation of a packaging system to generate one or more packages for the task to facilitate rapid execution of the task on an on-demand code execution system. Thus, the present disclosure represents an improvement on existing data processing systems and computing systems in general.

The general execution of tasks on the on-demand code execution system will now be discussed. Specifically, to execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance, and provisioning the containers with code of the task as well as any dependency code objects. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, the tasks established by a user may reference additional code objects on the on-demand code execution system 110. As will be described below, the on-demand code execution system 110 can be configured to provision an execution environment for a task with these additional code objects to facilitate execution of the task.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof)

corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the runtimes may also be user provided. Illustrative examples for utilization of user-provided runtimes on the on-demand code execution system are described in U.S. Pat. No. 10,303,492 issued May 28, 2019 (the "'492 Patent"), the entirety of which is hereby incorporated by reference. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

In accordance with embodiments of the present disclosure, the on-demand code execution system 110 may implement a variety of functionalities enabling code of a task to include additional code objects (e.g., dependencies) by reference, rather than directly submitting the additional code objects with the code of the task. For example, the on-demand code execution system 110 may implement an identification schema enabling unique identification of each code object submitted by a user or otherwise made available on the on-demand code execution system 110. Illustratively, the schema may identify a URI of each code object, such as by a combination of user identifier (e.g., user name) or organizational name (e.g., business entity) and object identifier (e.g., library name). In some embodiments, the schema may include additional information, such as a version number, region in which the object resides, etc. Thus, a user may be enabled to utilize a code object during execution of a task by reference to a URI of a code object (e.g., within metadata of a task), rather than being required to separately submit the code object with code of the task. Beneficially, use of references to code objects may reduce duplication of information on the on-demand code execution system 110. For example, where each user of a large organization uses a common library of functions, the on-demand code execution system 110 may be required to maintain only a single instance of that library (referenced by tasks of each user), rather than maintaining a separate instance provided by each individual user. Moreover, the common library may be updated, and the change applied to all tasks that reference the library, without requiring each user of each task to manually implement an update to the common library. Thus, use of references to code objects can benefit the ease of use of the on-demand code execution system 110, as well as operation of the on-demand code execution system 110.

In some embodiments, the on-demand code execution system 110 may implement authorization and access controls with respect to code objects. For example, the on-demand code execution system 110 may identify an owner of each code object (e.g., a user that submitted the code object) and enable the owner to designate permissions for the code object. Thereafter, the on-demand code execution system 110 may enable only users identified by those permissions to use the code object. Such use of permissions may enable, for example, private companies to share a common library of propriety code on the on-demand code execution system 110, without making such code available to the general public. Any of a variety of known authorization and access mechanisms may be applied to code objects as described in the present disclosure.

As noted above, use of multiple separate code objects within a task may create difficulties during execution of the task. For example, iterative retrieval of each code object used to execute code of a task may increase execution time of the task due to latency required to retrieve each code object. To address this issue, the on-demand code execution system 110 can include a packaging system 160 that combines one or more code objects within a dependency chain of a task into a package prior to receiving a call to execute the task. Specifically, the packaging system 160 can include a package generator 162 configured to identify code objects referenced by a task, as well as any additional code objects on which the task depends (e.g., second or additional levels of dependencies), and to combine the code of the task and the additional code objects into one or more packages. By packaging dependencies of a task into one or more packages, the total number of data files needed to execute the task can be reduced, thus reducing the latency overhead created by use of references to code objects within code of a task. In one embodiment, the package generator 162 may combine all dependency code objects for a task with the code of the task into a single file (which may be stored, for example, on the data storage service 108). Illustratively, the single file may be a compressed read only file system, such as a SquashFS file system, which may be loaded as an execution environment on VM instance within the active pool 140A of the on-demand code execution system 110 in order to execute the task.

By combining all data into a single data file, latency overhead created by use of code object references may be eliminated or substantially reduced. However, generation of a single data file combining all code objects for execution of a task may result in large amounts of data duplication on the on-demand code execution system 110 (e.g., each reference to a code object may cause the code object to be duplicated on the on-demand code execution system 110). Moreover, such duplication may negatively affect operation of the on-demand code execution system 110. For example, such duplication may increase the amount of information that must be transferred from data storage (e.g., at the data storage service 108) to the on-demand code execution system 110, resulting in slowed operation of the on-demand code execution system 110. To address this issue, the packaging system 160 may further include a graph analyzer configured to analyze a dependency graph of one or more tasks, and to identify which code objects within each task's dependency chain should be combined into packages, in order to maintain efficient operation of the on-demand code execution system 110. Operation of the graph analyzer is discussed in more detail below. However, in brief, the graph analyzer 164 may function to generate a directed graph of dependencies between data objects, and to identify subsets of that graph (e.g., including multiple code objects) to be combined into packages in order to achieve metric objectives on the on-demand code execution system 110 (e.g., a reduction in execution time of a task, memory space needed to store a task, etc.). As discussed below, the graph analyzer 164 may utilize operational information of the on-demand code execution system 110, such as prior execution time of a task, to identify which tasks to analyze as well as to identify how packages for the task should be created in order to maintain efficient operation of the on-demand code execution system 110.

While some functionalities are generally described herein with reference to an individual component of the on-demand code execution system 110, other components or a combination of components may additionally or alternatively implement such functionalities. For example, a worker manager 140 may operate to package code objects for tasks or to analyze dependency graphs for a task, in a manner similar or identical to as described herein with reference to a packaging system 160.

Figure 2:
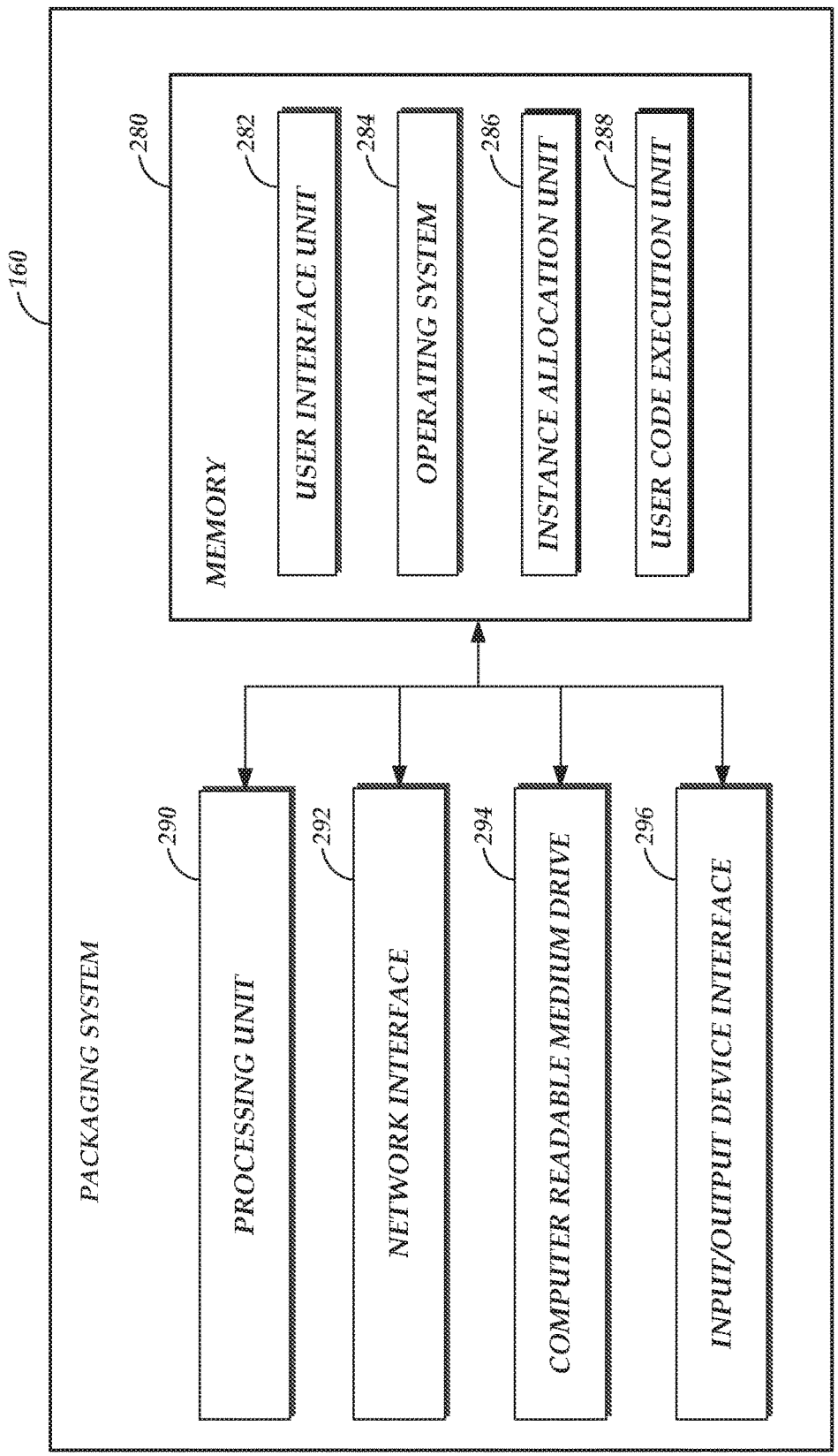
FIG. 2 depicts a general architecture of a computing device providing a packaging system that is configured to facilitate packaging of code objects into packages used to facilitate execution of tasks on the on-demand code execution system of FIG. 1.

FIG. 2 depicts a general architecture of a computing system (referenced as packaging system 160) that operates to analyze dependency graphs of tasks within the on-demand code execution system 110 and to generate packages for tasks (e.g. based on such dependency graphs). The general architecture of the packaging system 160 depicted in FIG. 2 includes an arrangement of computer hardware and software modules that may be used to implement aspects of the present disclosure. The hardware modules may be implemented with physical electronic devices, as discussed in greater detail below. The packaging system 160 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the packaging system 160 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a packaging unit 186 and a graph analysis unit 188 that may be executed by the processing unit 190. In one embodiment, the packaging unit 186 and graph analysis unit 188 individually or collectively implement various aspects of the present disclosure, e.g., analyzing dependency graphs of tasks within the on-demand code execution system 110 and to generating packages for tasks, potentially based on such dependency graphs, etc., as described further below.

While the packaging unit 186 and graph analysis unit 188 are shown in FIG. 2 as part of the packaging system 140, in other embodiments, all or a portion of the instance packaging unit 186 and graph analysis unit 188 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the worker manager 140.

In some embodiments, the packaging system 140 may further include components other than those illustrated in FIG. 2. For example, the memory 180 may further include an instance allocation unit for allocating execution environments to tasks, user code execution unit to facilitate execution of tasks within the execution environments, or a container manager for managing creation, preparation, and configuration of containers within virtual machine instances.

Figure 3:
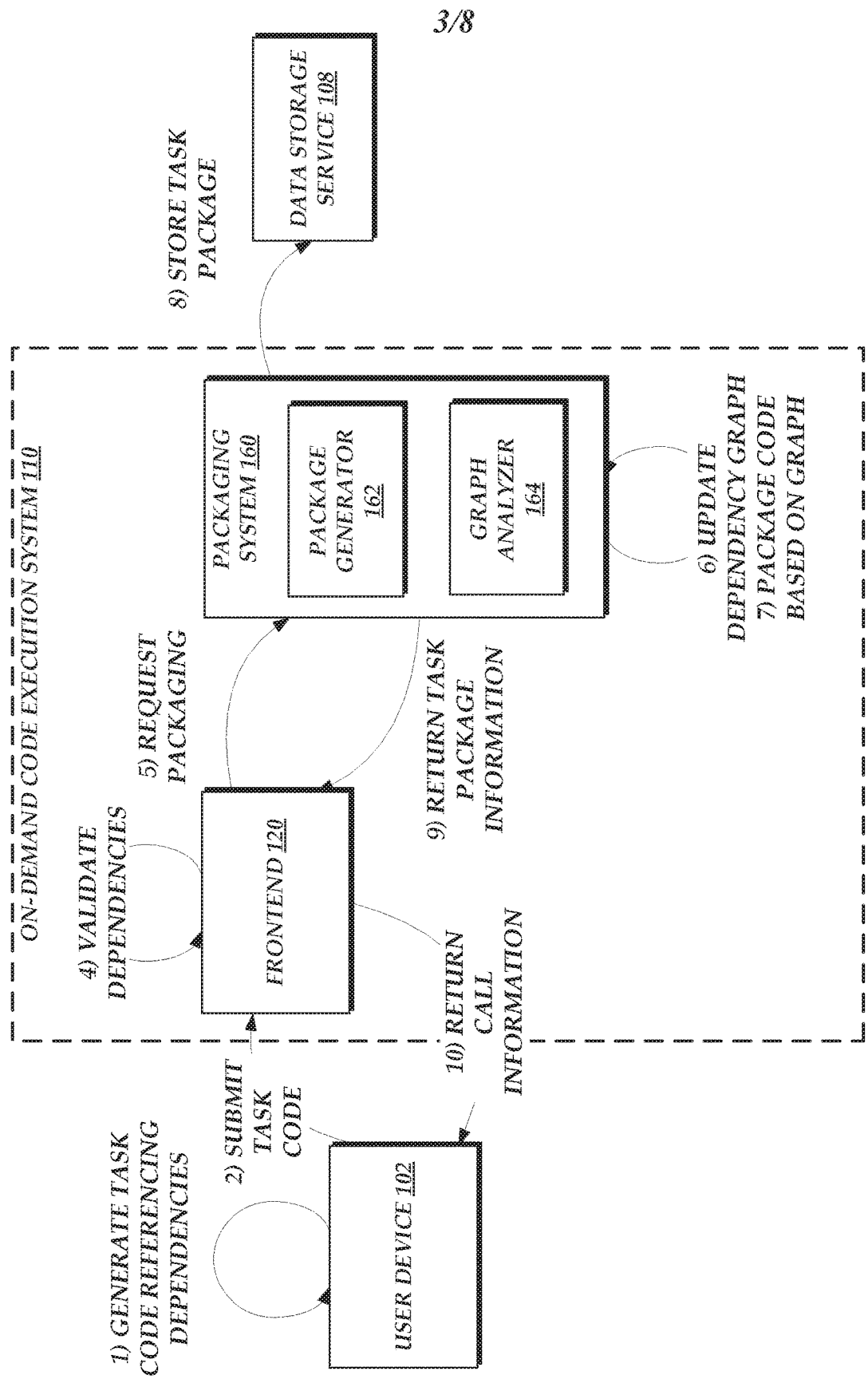
FIG. 3 is a flow diagram depicting illustrative interactions for submitting code corresponding to a task to the on-demand code execution system of FIG. 1, and for the on-demand code execution system to resolve dependencies within the code and generate a package used to facilitate execution of the task on the on-demand code execution system.

With reference to FIG. 3, illustrative interactions are depicted for generation of one or more packages used to execute code of a task, where such code depends on additional code objects referenced by the task. The interactions of FIG. 3 begin at (1), where a user device generates task code that references one or more dependency code objects. Illustratively, the user may generate code that references an additional code object by use of a URI of that code object. That additional code object may in turn reference additional code objects, etc. In some instances, one or more runtimes (e.g., corresponding to different programming languages) used to execute the task code or additional code objects may also be considered a dependency code object.

At (2), the user device 102 submits the task code to the frontend 120, such as by using a API or other interface of the frontend 120. At (3), the frontend 120 validates the dependencies referenced within data of the task. Validation can include, for example, verifying that all dependencies reference by a task exist and that the user of the user device 102 has appropriate permissions to access the dependencies. In some instances, validation may be applied only to dependencies directly referenced within the task. In other instances, validation may be applied to an entire dependency chain of the task (e.g., including second and third level dependencies, etc.).

At (4), the frontend 120 transmits a request to the packaging system 160 to generate a package for the task. The packaging system 160, in turn, generates a dependency graph for the task, such as by identifying all dependency code objects of the task, their dependencies, etc. Illustratively, generation of the dependency graph may include inspection of the metadata of the task to identify directly referenced code objects and iterative inspection of metadata for each directly referenced code object to identify their dependency code objects, etc., until all dependencies of the task are identified. While not shown in FIG. 3, identification of dependency code objects may include communication with the data storage service 108 to retrieve information regarding the code objects.

Thereafter, the packaging system 160, at (6), generates a package for the task based on the dependency graph. In one embodiment, the package includes the code of the task as well as all dependency code objects for the task. The package may correspond, for example, to a single file (such as a compressed file system) that can be provisioned to a device (e.g., a virtual machine) of the on-demand code execution system 110 in order to enable execution of the task. In some embodiments, the package may include a runtime environment (e.g., enabling execution of code in a given programming language). In other embodiments, the package may include all required code objects except one or more runtime environments for the task. For example, the on-demand code execution system 110 may maintain one or more execution environments that are "pre-warmed' with runtime environments, and thus inclusion of the runtime environment in a package for the task may be unnecessary. In other instances, the package may exclude other dependency code objects for the task. For example, where the task depends on a code object over a threshold size, the package for the task may exclude that code object to avoid duplication of that code object. Similarly, where the task depends on a code object that is also a dependency of a threshold number of additional tasks, the package for the task may exclude that code object to avoid duplication of that code object. In some instances, such criteria may be combined (e.g., a package may exclude a code object where that object is both over a threshold size and depended upon by a threshold number of other tasks).

In one embodiment, the configuration of packages for a task may depend on features of the dependency graph for the task. For example, the packaging system 160 may be configured such that the total number of files needed to execute a task does not exceed a threshold number (e.g., to limit latency overhead caused by multiple files). Thus, when the number of objects in the dependency graph for a task exceeds that total number, the packaging system 160 may combined data objects within the graph into one or more packages such that the total number of files needed to execute a task does not exceed the threshold number. As discussed below, packages for a task may in some instances be later modified based on operational data of the on-demand code execution system 110 (e.g., execution metrics of the task).

After generation of one or more packages for the task, the packaging system 160 stores the packages within the data storage service 108, at (7). Additionally, at (8), the packaging system 160 returns package information for the task to the frontend 120, to facilitate later execution of the task based on the packages. The package information may include, for example, a location for the one or more packages on the data storage service 108.

Figure 4:
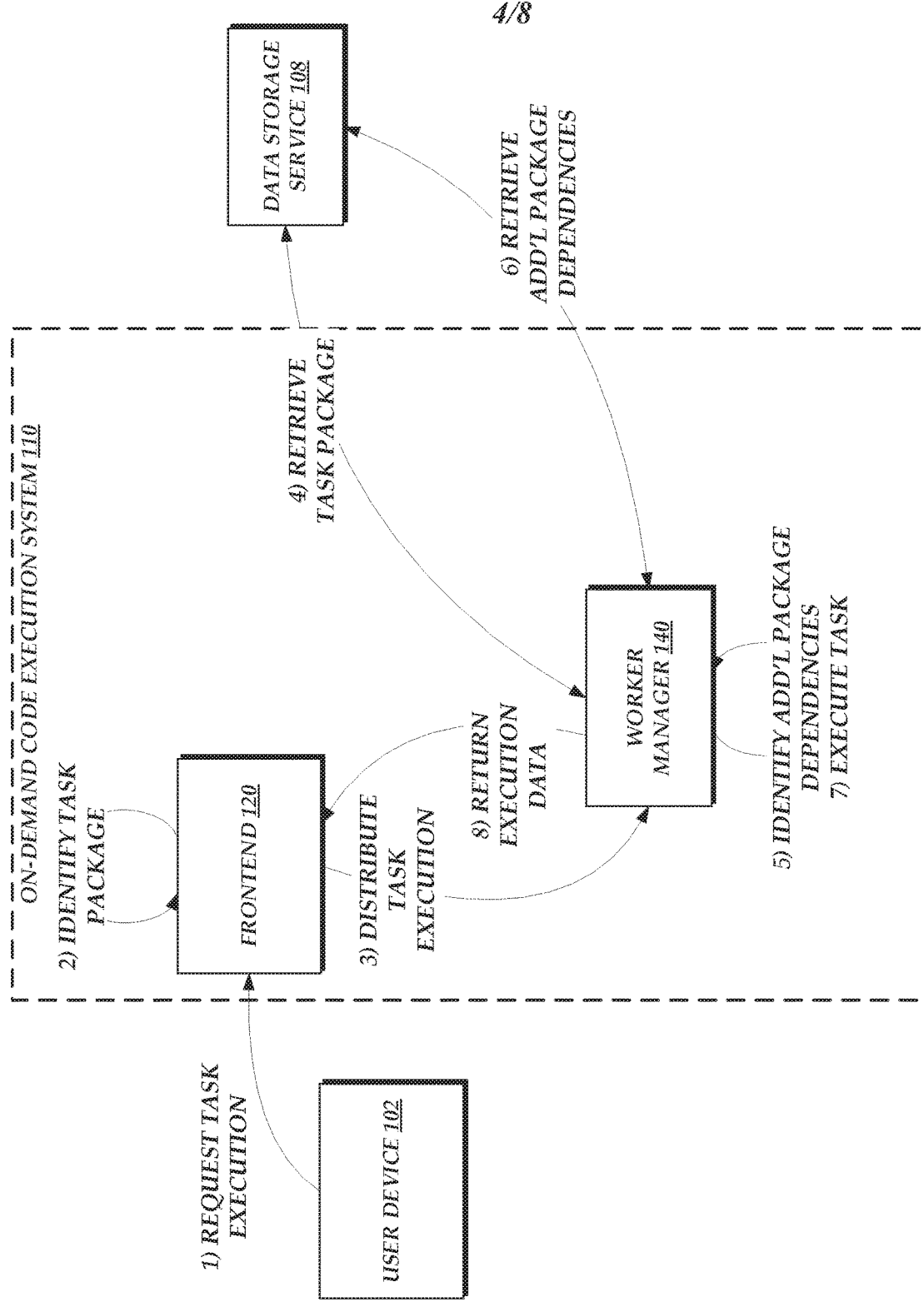
FIG. 4 is a flow diagram depicting illustrative interactions for executing a task utilizing one or more packages generated on the on-demand code execution system of FIG. 1.

With reference to FIG. 4, illustrative interactions for executing a task using one or more code object packages will be described. The illustrative interactions begin at (4), where a user device 102 submits a request to the frontend 120 for execution of a task. While the request is shown in FIG. 4 as shown as generated at a user device 102, one skilled in the art will appreciate that the request may be received from a variety of other sources, or generated at the on-demand code execution system 110 itself, in accordance with the present disclosure.

At (2), the frontend 120 distributes the task for execution to the worker manager 140. Prior to distributing the task execution, the frontend 120 may undertake any of a number of additional interactions, such as queuing the request, validating the request, etc., as described in more detail within the '556 Patent, incorporated by reference above.

At (3), the worker manager 140 identifies an initial code object or package for the task. The initial code object or package may correspond, for example, to a code object or package that includes code of the task itself, alone or in combination with dependency code objects of the task. At (4), the worker manager 140 interacts with the data storage service 108 to retrieve the initial code object or package. For example, the worker manager may retrieve a data file including the initial code object or package. At (5), the worker manager 140 determines, from the initial code object or package, whether any additional dependencies exist for the task. Illustratively, the worker manager 140 may inspect the initial code object or package to determine whether any references exist to code objects not already present within a device (e.g., a virtual machine) of the on-demand code execution system 110. For example, if an initial package for the task includes all dependencies for the task, the worker manager 140 may determine that no additional dependencies exist. Similarly, if the initial package for the task includes all dependencies for the task except for a runtime required by the task, but the on-demand code execution system 110 includes a virtual machine that already includes that runtime (e.g., as a currently executing environment or a pre-warmed environment), the worker manager 140 may determine that no additional dependencies exist. If the initial code object or package references a dependency code object or package not presently available at the on-demand code execution system 110, the worker manager 140, at (6), retrieves the additional dependences from the data storage service 108. Interactions (5) and (6) may thereafter be repeated, such that each retrieve dependency code object or package is inspected to retrieve any additional dependency code objects or packages, until all dependencies of a task are identified and available at the on-demand code execution system 110.

Thereafter, at (7), the worker manager 140 executes the task. Execution of a task may include, for example, provisioning an execution environment with code of the task and all dependency data objects, and causing execution of the task. Location and provisioning of execution environments, as well as execution of code within such environments, is discussed in more detail within the '556 Patent, incorporated by reference above.

In some embodiments, the ordering and implementation of operations described above may be modified, or these interactions may be carried out by additional or alternative elements of the on-demand code execution system. For example, in one embodiment, the worker manager 140 may be configured to provision an execution environment with an initial code object, such as a runtime, in accordance with interactions (3) and (4), above. These interaction may occur, for example, prior to a task execution being distributed to the worker manager 140. On receiving distribution of a task execution, the worker manager 140 may instruct the execution environment (e.g., as previously provisioned with a runtime) to execute the task. The environment, based on such instructions, may then implement interactions (4) and (5), by identifying and retrieving additional dependencies from the data storage service 108. Thereafter, the execution environment may execute code of the task, thus fulfilling the execution instructions of the frontend 120. Illustrative mechanisms for an environment to identify and retrieve code objects in order to execute a task are described in more detail within the '492 Patent, incorporated by reference above.

As will be appreciated by one skilled in the art, the configuration of code objects and packages for a task may substantially impact the speed and resource use required to implement the interactions of FIG. 4. For example, multiple iterations of interactions (5) and (6) of FIG. 4 may add substantial overhead to the total time of the interactions of FIG. 4, particularly where the latency between the on-demand code execution system 110 and the data storage service 108 is non-negligible. Conversely, retrieval by the worker manager 140 of unnecessary code objects from the data storage service 108 (e.g., code objects that are already present at the on-demand code execution system 110, though perhaps in a different package) may also substantially impact the total time of the interactions of FIG. 4. Thus, it may be desirable to modify the packages for one or more tasks on the on-demand code execution system 110 in order to manage the expected execution time of those tasks.

Figure 5:
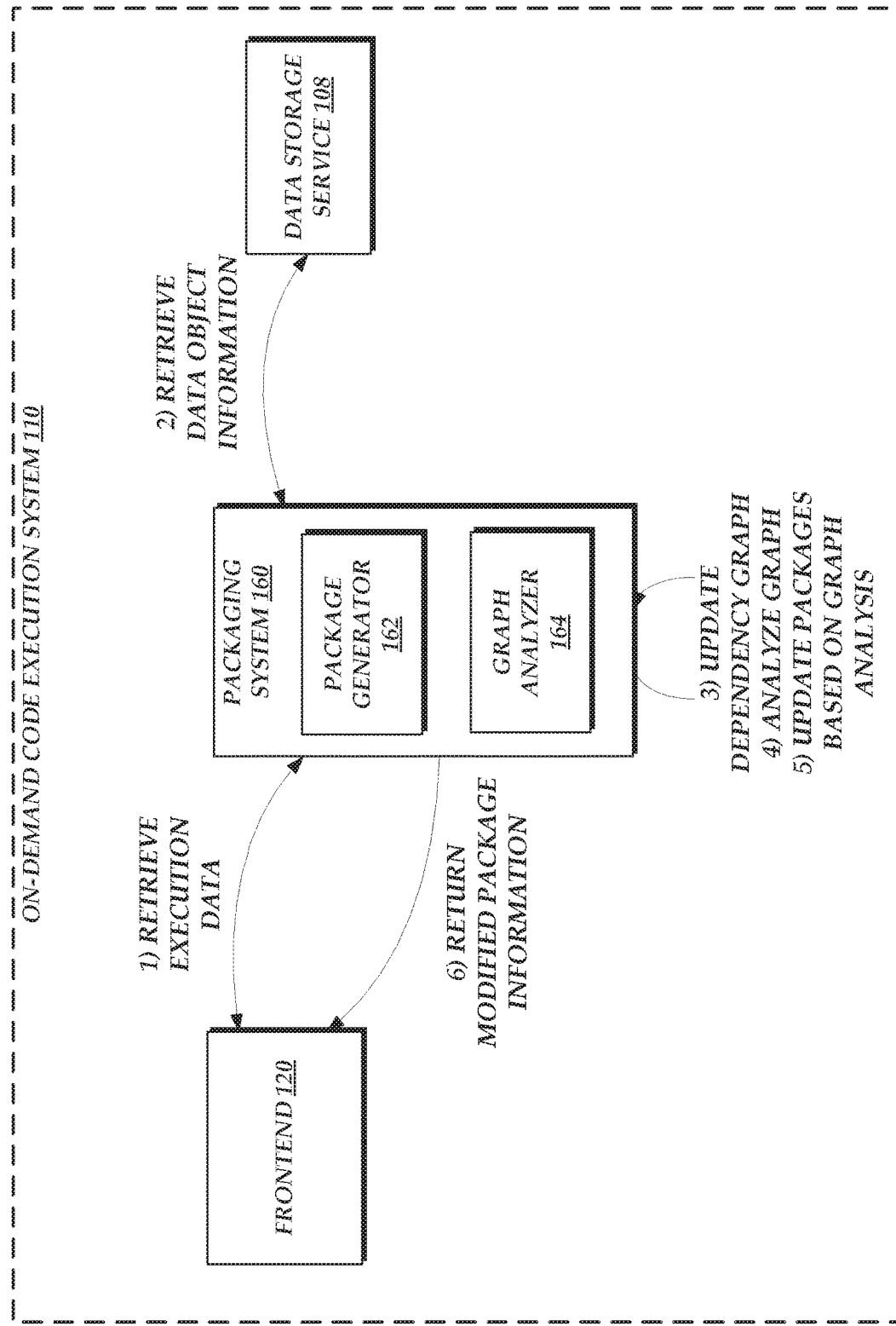
FIG. 5 is a flow diagram depicting illustrative interactions for modifying packages on the on-demand code execution system of FIG. 1 based on analysis of a dependency graph of multiple tasks, to facilitate rapid execution of tasks on the on-demand code execution system of FIG. 1.
Figure 6:
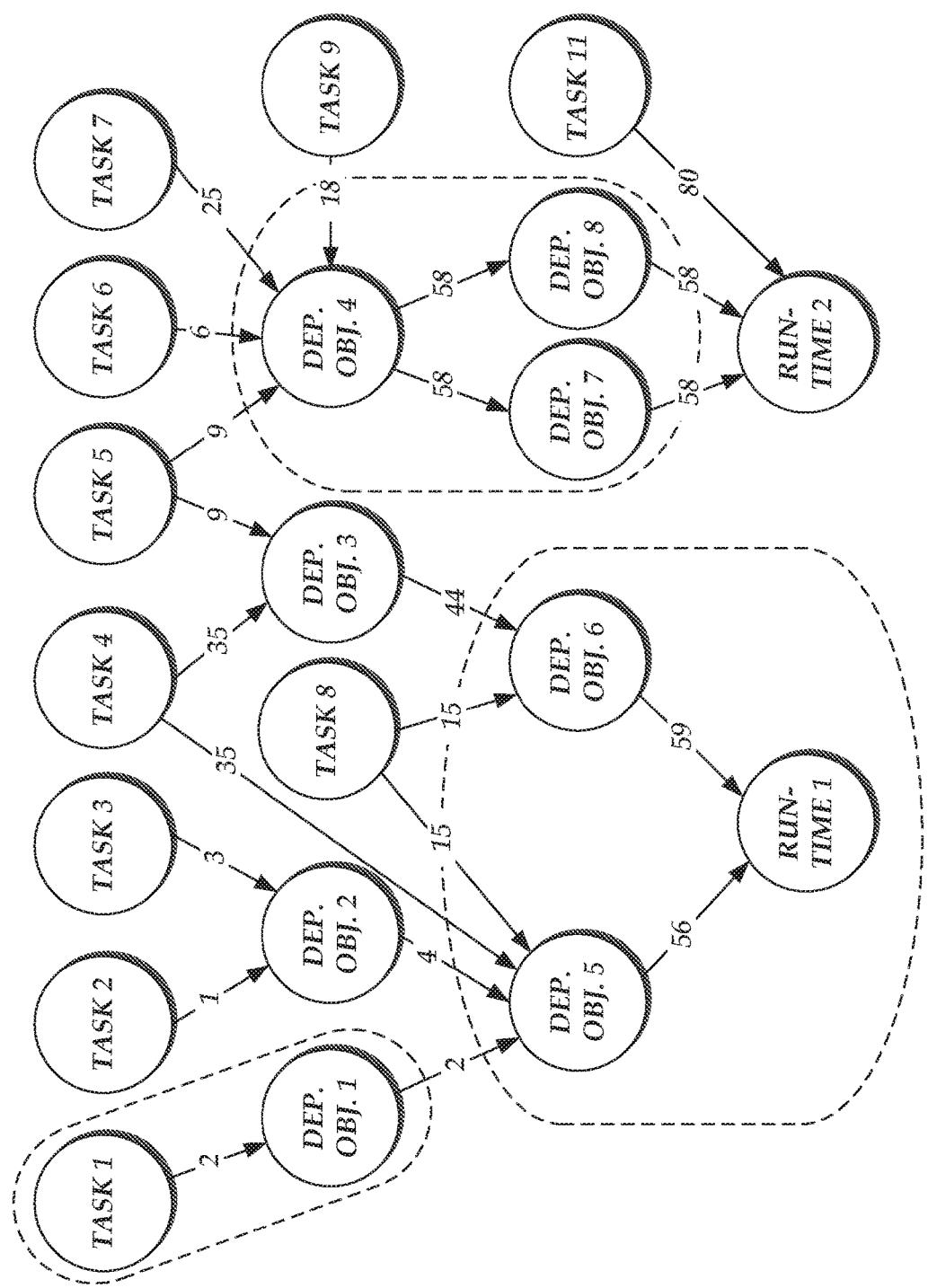
FIG. 6 is an illustrative visualization of a dependency graph of multiple tasks, which may be analyzed to modify packages on the on-demand code execution system of FIG. 1.

Illustrative interactions for modifying packages for one or more tasks on the on-demand code execution system 110 in order to manage the expected execution time of those tasks will be described with reference to FIGS. 5 and 6. Specifically, FIG. 5 depicts illustrative interactions on the on-demand code execution system 110 during which the packaging system 160 may modify packages for one or more tasks, while FIG. 6 depicts an illustrative dependency graph for the one or more tasks, including collections of code objects within the dependency graph that may be selected by the packaging system 160 for inclusion in packages. The interactions of FIG. 5 may be undertaken with respect to any number of tasks on the on-demand code execution system 110. For example, the interactions of FIG. 5 may be implemented with respect to all tasks of a specific user, all tasks of a specific organization, or all tasks on the on-demand code execution system 110. For the purposes of illustration, only a limited number of tasks are depicted within FIG. 6. However, in practice, a dependency graph may include any number of tasks.

The interactions of FIG. 5 begin at (1), where the packaging system 160 retrieves from the frontend 120 execution data for the analyzed tasks. The execution data may include, for example, a number of calls to execute each task, as well as metrics for execution of the tasks. Such metrics may include, for example, an average total time to begin execution of the task (e.g., a time between receiving a call to execute the task at the on-demand code execution system 110 and beginning execution of the task), an average time required to retrieve all code objects or packages for the task from the data storage service 108, a number of requests to the data storage service 108 required to retrieve all code objects or packages for the task, an average latency introduced by virtue of each request, and metrics regarding the execution environments in which the task was executed (including, e.g., whether such execution environments utilized already existing copies of a code object or package for the task, as opposed to retrieving such a code object or package from the data storage service 108).

Additionally, at (2), the package system 160 retrieves code object information for the one or more tasks from the data storage service 108. The code object information may include, for example, a size of each code object. In some instances, the code object information may also include dependency information for each code object, to facilitate generation of dependency graphs for the one or more tasks.

Thereafter, at (3), the packaging system 160 generates a dependency graph for the one or more tasks. The graph may include nodes representing each code object (including code of the tasks, dependency code objects referenced directly or indirectly by such tasks, runtimes used to execute the tasks, etc.). Edges between nodes may represent dependencies of a code object represented by a first node on a code object represented by the second node. In some instances, edges may be weighed based on a number of executions that relied on that dependency over a given past period of time (e.g., 24 hours). Additionally, in some instances, nodes may be weighted based on the memory required to represent a code object.

One illustrative visualization of such a dependency graph is shown in FIG. 6. The illustrative graph of FIG. 6 includes 11 tasks, designated "Task 1," "Task 2," etc. As shown in FIG. 6, each task depends on one or more dependency code objects, eventually terminating in a runtime (which may be considered a special case of a dependency code object). The edges between the nodes of FIG. 6 represent dependencies between code objects, arranged in the direction of the dependency. For example, Task 1 of FIG. 6 depends on dependency code object 1, which in turn depends on dependency code object 5, which in turn depends on run time 1. The edges of FIG. 6 are illustratively weighted according to the number of times the dependency has been relied on at the on-demand code execution system 110 within a past period of time (e.g., 24 hours). For example, the edge between Task 1 and dependency code object 1 has a weight of 2, indicating that this dependency has been relied on twice in the past period of time (e.g., representing two calls to execute Task 1).

The visualization of FIG. 6 illustrates different combinations of code objects that may be identified by the packaging system 160 (e.g., using the graph analyzer 164) for combination into a package. For example, as shown in FIG. 6, dependency object 1 is a dependency only of task 1. Thus, the packaging system 160 may identify both task 1 and dependency object 1 for combination into a package 602 (e.g., since dependency object 1 is not expected to be needed except in combination with task 1).

As another example, all uses of runtime 1 stem from dependency objects 5 and 6. However, calls to dependency objects 5 and 6 stem from a variety of different dependency objects. Moreover, a large proportion of calls to dependency objects 5 and 6 stem from tasks that depend on both those objects (specifically, tasks 4 and 8). Thus, the packaging system 160 may identify runtime 1, dependency object 5, and dependency object 6 for combination within a package 604. Note that such a combination may have a detrimental effect on the speed of execution of some tasks, such as task 1, because loading of the combined package of runtime 1, dependency object 5, and dependency object 6 may cause loading of unnecessary information for task 1 (specifically, dependency object 6). However, the packaging system 160 may determine that this detrimental effect is allowable given the low frequency of calls to take 1 as compared to those tasks that depend on the full combination of code objects with the package.

As yet another example, the packaging system 160 may determine that a given combination of dependency objects is called only in combination. For example, as shown in FIG. 6, dependency objects 4, 7, and 8 are represented as called only in combination. Moreover, this combination of dependency objects depends on a specific runtime: runtime 2. Thus, it may be possible for the packaging system 160 to combine dependency objects 4, 7, and 8 with runtime 2 into a single package. However, runtime 2 may also be depended upon by other tasks, such as task 11, which do not depend on dependency objects 4, 7, and 8. Moreover, task 11 may be called a similar number of times to dependency objects 4, 7, and 8 (e.g., 80 times as compared to 58). Thus, the packaging system 160 may determine that combination of dependency objects 4, 7, and 8 with runtime 2 into a single package is not allowable, as it may be excepted to have a significant detrimental effect on execution of task 11. Instead, the packaging system 160 may combine dependency objects 4, 7, and 8 into package 606, while maintaining runtime 2 as a separate code object. This may in some instances increase the number of files required to be retrieved to execute tasks that depend on dependency objects 4, 7, and 8, since runtime 2 may be required to be retrieve separately. However, in other instances, this selection may actually decrease execution time of such tasks, since runtime 2 may already be available at the on-demand code execution system 110 by virtue of a current or recent execution of task 11. Moreover, given the frequency of calls to runtime 2 and its availability as an independent data object, the on-demand code execution system 110 may be configured to maintain "pre-warmed" environments including runtime 2, thus increasing the performance of execution of any task that depends on runtime 2.

In some embodiments, the packaging system 160 may analyze a dependency graph (such as the illustrative graph of FIG. 6) according to pre-established rules, in order to identify minimum combinations of code objects to be combined within a package. For example, the packaging system 160 may be configured with a rule such that any dependency object that is depended on only by a single code object is combined with that single code object into a package (e.g., resulting in packages 602 and 606), or with a rule such that if any two dependency objects are called together in more than a threshold percentage (e.g., 80%) of calls to the objects, that the two dependency objects are combined within a package (e.g. resulting in package 604). Note, however, that the packages of FIG. 6 are shown for illustrative purposes only, and other configuration of packages are possible and contemplated within the present disclosure. For example, the packages of FIG. 6 are shown as non-overlapping. However, the packaging system 160 may also identify overlapping packages in order to facilitate more rapid execution of tasks. For example, runtime 2 may be maintained in two forms: one included within package 606, and another combined into a package with task 11, thus potentially increasing performance of all tasks depending on runtime 2 (but potentially decreasing re-usability of runtime 2 between executions of tasks that depend on package 606 versus executions of task 11). Moreover, the package 604 may in some instances be expanded to include other code objects, such as dependency objects 2 or 3, or even tasks that depend on the other objects of that package. In general, inclusion of additional code objects within a package may depend on the size of the object (e.g., representing the extraneous information within the package when that object is not used) as well as the frequency of use of the package when compared to the frequency of use of the additional code objects. Illustratively, a small, frequently used code object may be more likely to be included within a package, while a large, infrequently used code object may be less likely to be included within the package.

In some embodiments, inclusion of code objects within a package may additionally depend on permissions associated with each code object. For example, package manager 160 may establish the permission of a package as the most restrictive permission of any code object within the package. Thus, for example, the package manager 160 may be restricted from including two tasks with mutually exclusive access policies (e.g., of two different users) within the same package, since such a package may not be accessible to any user. Similarly, inclusion of an organization-specific, proprietary code object within a package otherwise including public code objects may render the package usable only to that organization (and may thus require maintaining a separate version of the public code objects).

In some instances, the package manager 160 may implement graph analysis based on execution metrics of tasks on the on-demand code execution system 110. For example, the package manager 160 may identify one or more tasks of the on-demand code execution system 110 whose execution metrics fall outside of a desired range (e.g., as determined across the on-demand code execution system 110, based on service level agreements ["SLAs"] attributable to the tasks, etc.). Thereafter, the on-demand code execution system 110 may generate a dependency graph for the tasks as well as any related tasks (e.g., tasks sharing common dependencies with those tasks, potentially within a given organization or of a given user). The packaging system 160 may then attempt to modify packages of the dependency graph in order to render execution metrics of the non-conforming tasks within desired ranges. The packaging system 160 may implement a number of rules to alter execution metrics. For example, where a significant portion of the time to execute a task is attributable to latency overhead due to retrieval of multiple packages, the packaging system 160 may attempt to reduce the number of total code objects or packages needed to execute a task by combining nodes within a dependency chain for the task into larger packages. Where a significant portion of the time to execute a task is attributable to data transfer of dependency objects within the dependency chain, the packaging system 160 may attempt to "break apart" packages on which the task depends, such that the resulting packages are also used by other frequently called tasks (potentially enabling re-use of the resulting packages and minimizing retrieval of the packages from outside of the on-demand code execution system 110). The packaging system 160 may attempt to estimate the time to begin execution of a task under the modified packages based on the expected number of files (e.g., code objects or packages) to be retrieved, the latency of each retrieval, and the time needed to transfer each file (e.g., based on historical bandwidth measures). Illustratively, the packaging system 160 may attempt to optimize the dependency graph such that the estimated time to begin execution of each task falls under a threshold level (e.g., 50 ms). In some instances, the packaging system 160 may further attempt to optimize the dependency graph to minimize duplication of data (e.g., such that the size of all packages and independently-stored code objects, when summed, does not exceed a given multiplier of the size of all code objects if stored individually).

Returning to the interactions of FIG. 5, on completing analysis of the dependency graph and determining packages to be created for the graph, the packaging system 160, at (5), updates the packages, as stored within the data storage service 108. Thus, future executions of the tasks identified within the dependency graph can be enabled to utilize the updated packages, increasing the likelihood that such executions conform to execution metrics desired for the on-demand code execution system 110.

Figure 7:
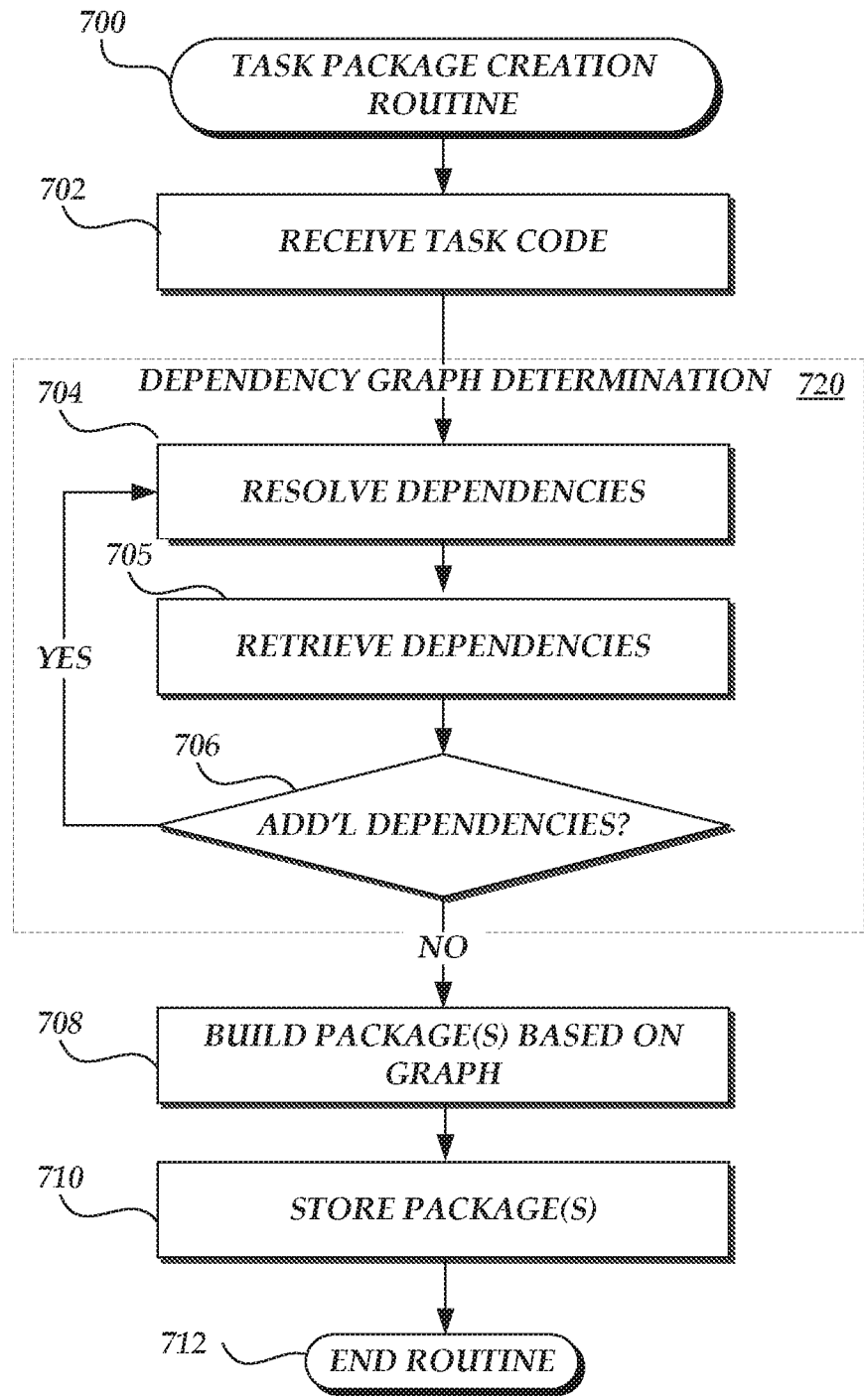
FIG. 7 is a flow chart depicting an illustrative routine for packaging one or more code objects into a package to facilitate execution of a task on the on-demand code execution system of FIG. 1.

With reference to FIG. 7, one illustrative routine 700 for generating one or more packages for a task on the on-demand code execution system 110 will be described. The routine 700 may be carried out, for example, by the packaging system 170 of FIG. 1 (e.g., utilizing the package generator 172 and graph analyzer 174). In one embodiment, the routine 700 is carried out in conjunction with creation of the task at the on-demand code execution system 110. The routine 700 may additionally or alternatively be carried out at other times, such as periodically (e.g., once per day, week, month, etc.) or based on detection that execution metrics (such as a time to begin execution) fall outside a threshold range.

The routine 700 begins at block 702, where the packaging system 170 obtains code for the task (e.g., as submitted by a user). In one embodiment, the code for the task is represented as a code object, such as a compressed file including source code for the task. The routine 700 then continues to blocks 704 and 706, where the packaging system 170 determines a dependency graph for the task, shown in FIG. 7 as block collection 720. Determination of a dependency graph may represent an at least partially iterative process, whereby each code object is inspected for references to another code object, the other code object is retrieved and inspected for references to further code objects, and the process is repeated until all dependencies are identified. Accordingly, at block 704, the packaging system 170 resolves dependencies of the task code to identify any additional code objects. Illustratively, the packaging system 170 may inspect metadata of the task code to identify one or more URIs within that metadata that reference additional code objects on the on-demand code execution system 110. Thereafter, the packaging system 170, at block 705, retrieves the identified dependency code objects and, at block 706, determines whether those dependency code objects, in turn, reference any additional code objects. If so, the routine 600 can continue to loop through blocks 704 through 706 until all dependency code objects are identified. In some instances, the routine 600 may further include branching out of the dependency graph, such as by determining whether the dependency code objects of the graph are depended on by other tasks within the on-demand code execution system 110.

When no additional code objects remain to be identified, determination of the dependency graph completes, and the routine 700 proceeds to block 708, where the packaging system 170 builds one or more packages for the task based on the graph. In one embodiment, the packaging system 170 may be configured to implement a "minimal packaging" strategy, whereby code of the task is combined only with code objects that are not a dependency of any other task on the on-demand code execution system 110. In another embodiment, the packaging system 170 may be configured to implement a maximal packaging strategy, whereby code of the task is combined with all or nearly-all dependency code objects, to minimize the number of files needed to provision an execution environment prior to execution of the task. In the case of nearly-all code objects, the packaging system 170 may omit code objects expected to already be available at the on-demand code execution system 110 prior to receiving a request to execute the task, such as commonly used runtime environments or libraries maintained at the on-demand code execution system 110 to speed provisioning of execution environments. In either instance, the packaging system 170 may thereafter modify the configuration of packages based on actual or expected execution metrics for the task. For example, the packaging system 170 may determine an expected time for the task to begin execution given a current package configuration, based on either historical metrics or an estimated value. Such an estimated value may be based, for example, on the number of packages, latency associated with each package retrieval, a size of each package, bandwidth available to transfer the package, the likelihood that a package will already be available at the on-demand code execution system 110 prior to a request to execute code, or a combination thereof. Where the expected time for the task to begin execution exceeds a threshold level (e.g., a predetermined threshold, a threshold based on the average time for other tasks to begin execution, etc.), the packaging system 170 may attempt to modify the package configuration to reduce the expected time for the task to begin execution. Illustratively, where latency values due to repeated retrieval of files represents a significant portion of the expected time for the task to begin execution, the packaging system 170 may attempt to reduce the number of packages or code objects needed to begin execution by combining the code objects of the dependency graph into fewer packages. Where file transfer time (e.g., time to transfer packages or code objects from an external storage system) represents a significant portion of the expected time for the task to begin execution, the packaging system 170 may attempt to separately package dependency code objects within the dependency graph that are also dependencies of other tasks, thereby increasing the potential for those dependency code objects to be already present at the on-demand code execution system 110 when a call to execute the task is received. The packaging system 170 may also modify a package configuration for the task based on other rules or desired metrics. For example, the packaging system 170 may attempt to create packages within a threshold size range, or attempt to avoid excessive duplication of code objects by separately packaging the code objects for multiple tasks or under different permissions.

After determining a desired package configuration for the task, the packaging system 170, at block 708, builds one or more packages for the task based on the determined dependency graph. In one embodiment, each package may include one or more code objects for the task (e.g., code of the task itself, dependency code objects, etc.) and be represented as a single file. The file may correspond, for example, to a compressed file system representation, such as a SquashFS file. Thereafter, at block 710, the packaging system 170 stores the packages (such as in an external file system) for later use on the on-demand code execution system 110. The routine 700 then ends at block 712.

Figure 8:
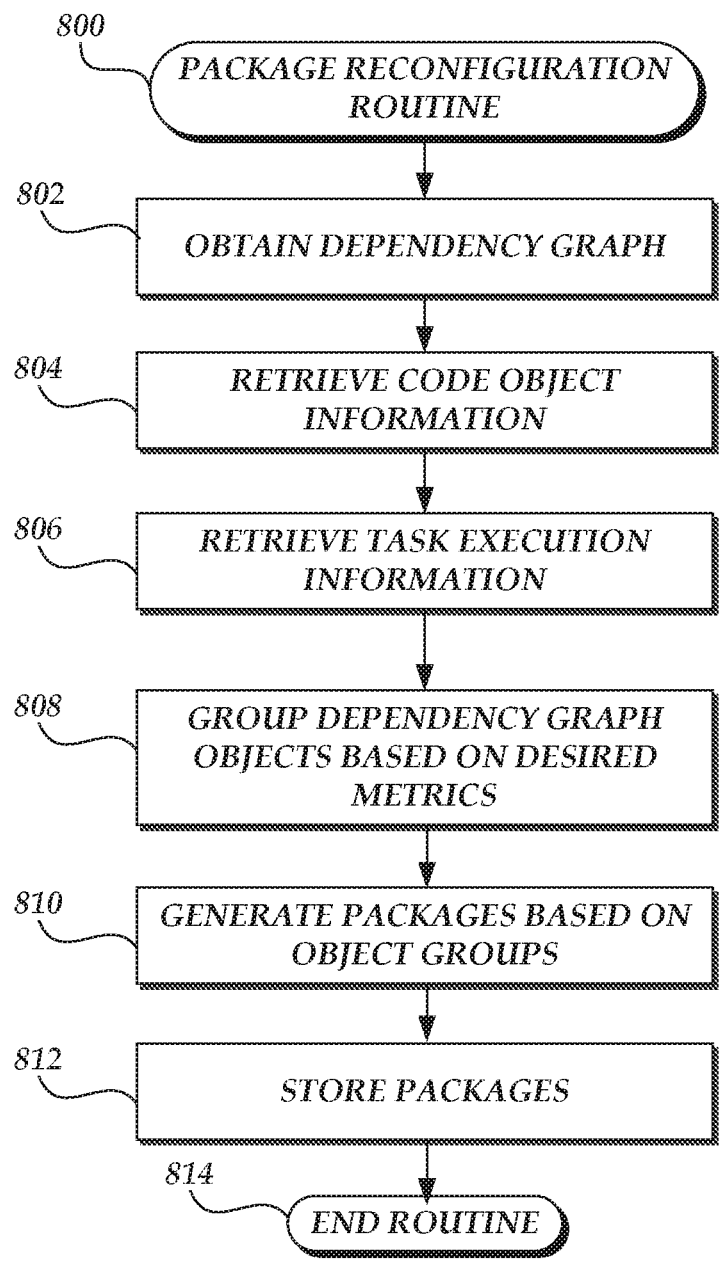
FIG. 8 is a flow chart depicting an illustrative routine for modifying packages on the on-demand code execution system of FIG. 1 based on analysis of a dependency graph of multiple tasks, to facilitate rapid execution of tasks on the on-demand code execution system of FIG. 1.

With reference to FIG. 8, one illustrative routine 800 for reconfiguring packages for one or more tasks will be described. The routine 800 may be implemented, for example, by the packaging system 170 of FIG. 1 (e.g., utilizing the package generator 172 and graph analyzer 174). In one embodiment, the routine 800 is carried out periodically (e.g., once per day, week, month, etc.) or based on detection that execution metrics (such as a time to begin execution) of one or more tasks fall outside a threshold range.

The routine 800 begins at block 802, where a dependency graph for one or more tasks is obtained. In one embodiment, the dependency graph may be obtained in pre-generated form (e.g., as generated due to prior implementation of the routine 700 of FIG. 7, for example). In other embodiment, the routine 800 may include generation of the dependency graph (e.g., in a manner similar or identical to that described with respect to FIG. 7).

Thereafter, at block 804, the packaging system 170 obtains code object information for code objects within the dependency graph. The information may include, for example, a size of the code object, one or more current locations of the code object within an external storage system (e.g., as a stand-alone code object, as being included in one or more packages, etc.), permissions of the code object, etc. The information may be obtained, for example, from an external storage system storing the code objects for use on the on-demand code execution system 110.

At block 806, the packaging system obtains task execution information for the one or more tasks. The task execution information may include, for example, a frequency of execution of the task, as well as metrics regarding those executions, such as a time to begin execution and various factors contributing to the time to begin execution (e.g., the packages or code objects retrieved from an external file system, number of requests to the external file system to retrieve the packages or code objects, latencies of those requests, transfer times of the packages or code objects, etc.).

At block 808, the packaging system 170 groups the code objects of the dependency graph based on desired metrics. In one embodiment, the metrics may include a desired time to begin execution for each task (e.g., under a threshold number of milliseconds), a desired redundancy of storage for code objects (e.g., under a threshold redundancy number), or a combination thereof. Illustratively, the packaging system 170 may identify any tasks whose historical time to begin execution metrics (e.g., under a current package configuration) do not conform to desired time to begin execution metrics. The packaging system 170 may then attempt to reconfigure the packages for the task into a state expected to enable satisfaction of the desired time to begin execution metrics (e.g., without also causing another task to fail to meet the desired time to begin execution metrics). Illustratively, where latency values due to repeated retrieval of files represents a significant portion of the expected time for the task to begin execution, the packaging system 170 may attempt to reduce the number of packages or code objects needed to begin execution by combining the code objects of the dependency graph into fewer packages. Where file transfer time (e.g., time to transfer packages or code objects from an external storage system) represents a significant portion of the expected time for the task to begin execution, the packaging system 170 may attempt to separately package dependency code objects within the dependency graph that are also dependencies of other tasks, thereby increasing the potential for those dependency code objects to be already present at the on-demand code execution system 110 when a call to execute the task is received. As a further illustration, where a redundancy metric of a code object exceeds a desired redundancy level, the packaging system 170 may attempt to reduce that redundancy level by reducing the number of packages including the code object (e.g., such that the code object is placed in fewer packages that are shared by more tasks) without causing any task's expected time to begin execution to exceed a threshold amount. The packaging system 170 may apply other rules to determine groups of dependency objects, such as combining code objects or packages that are frequency used together. For example, where more than a threshold % of uses of a package or code object also use another package or code object, the packaging system 170 may attempt to combine the frequently-used-together code objects or packages. Thus, the packaging system 170 may analyze the dependency graph to determine groupings of code objects that are expected to enable execution of the tasks reflected in the dependency graph according to desired metrics of the on-demand code execution system 110.

Thereafter, at block 810, the packaging system 170 can generate packages based on the code object groups identified at block 808. Illustratively, each group of code objects may be combined into a single file, such as a compressed file system data file, representing a package. Thereafter, each package can be stored (e.g., on an external data storage system) for use by the on-demand code execution system 110 at block 812. The routine 800 can then end at block 814.

The blocks of the routines described above may vary in embodiments of the present disclosure. For example, in some implementations of either routine, the packaging system 170 may be configured to implement additional functionality, such as validating the dependencies of a task (e.g., to ensure each code object exists, that the task is associated with sufficient permissions to use the code objects, etc.). Thus, the routines may include additional blocks, or the blocks of the routines may be rearranged, according to various embodiments.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more non-transitory data stores configured to store code objects, individual code objects associated with an object identifier and including code executable on an on-demand code execution system; and
   one or more processors in communication with the one or more non-transitory data stores and configured with computer-executable instructions to:
   receive a request to generate a task on the on-demand code execution system, the request including a code object including task code executable to implement the task and an identifier of at least one additional code object required to execute the task code;
   generate a dependency graph for the task, the dependency graph identifying the code object included within the request and the at least one additional code object corresponding to the identifier of the request;
   group code objects identified in the dependency graph into one or more packages, individual packages of the one or more packages including at least one code object identified within the dependency graph, wherein the code objects are grouped into the one or more packages based at least partly on an expected time to provision an execution environment on the on-demand code execution system with the one or more packages, and wherein the expected time to provision the execution environment is based at least partly on an expected caching of individual packages within the one or more packages on the on-demand code execution system and an expected time to transfer uncached packages of the one or more packages between the one or more non-transitory data stores and the execution environment;
   generate the one or more packages;
   store the one or more package within the one or more non-transitory data stores;
   receive a request to execute the task on the on-demand code execution system; and
   execute the task on the on-demand code execution system at least partly by retrieving the one or more packages from the one or more non-transitory data stores and provisioning the execution environment of the on-demand code execution system with the one or more packages.

2. The system of claim 1, wherein the at least one additional code object corresponds to at least one of a code library, frameworks, software development kits (SDKs), drivers, or a runtime.

3. The system of claim 1, wherein the identifier of at least one additional code object required to execute the task code corresponds to a uniform resource identifier (URI).

4. The system of claim 1, wherein generating the dependency graph for the task comprises identifying, within the at least one additional code object corresponding to the identifier of the request, a reference to a third code object, and wherein the dependency graph identifies the third code object as a dependency of the at least one additional code object.

5. A computer-implemented method comprising:
   receiving a request to generate a task on an on-demand code execution system, the request including a code object including task code executable to implement the task and an identifier of at least one additional code object required to execute the task code;
   generating a dependency graph for the task, the dependency graph identifying the code object included within the request and the at least one additional code object corresponding to the identifier of the request;
   grouping code objects identified in the dependency graph into one or more packages, individual packages of the one or more packages including at least one code object identified within the dependency graph, wherein the code objects are grouped into the one or more packages based at least partly on an expected time to provision an execution environment on the on-demand code execution system with the one or more packages, and wherein the expected time to provision the execution environment is based at least partly on an expected caching of individual packages within the one or more packages on the on-demand code execution system and an expected time to transfer uncached packages of the one or more packages to the execution environment;
   generating the one or more packages;
   receiving a request to execute the task on the on-demand code execution system; and
   executing the task on the on-demand code execution system at least partly by provisioning the execution environment of the on-demand code execution system with the one or more packages.

6. The computer-implemented method of claim 5, wherein the at least one additional code object corresponding to the identifier of the request is associated with a set of permission requirements for utilizing the at least one additional code object, wherein the request is received from a user associated with a set of user permissions, and wherein the computer-implemented method further comprises verifying that the set of user permissions satisfies the a set of permission requirements.

7. The computer-implemented method of claim 5, wherein individual packages of the one or more packages correspond to individual files, and wherein at least one of the individual packages corresponds to a compressed file system image file.

8. The computer-implemented method of claim 5, wherein the expected caching of individual packages within the one or more packages on the on-demand code execution system is based on an expected frequency of use of the individual packages on the on-demand code execution system.

9. The computer-implemented method of claim 5 further comprising determining that the expected time to provision an execution environment on the on-demand code execution system with the one or more packages satisfies a threshold value.

10. Non-transitory computer readable media including computer-executable instructions that, when executed by a processor of an on-demand code execution system, cause the processor to:
   receive a request to generate a task on the on-demand code execution system, the request including a code object including task code executable to implement the task and an identifier of at least one additional code object required to execute the task code;
   generate a dependency graph for the task, the dependency graph identifying the code object included within the request and the at least one additional code object corresponding to the identifier of the request;
   group code objects identified in the dependency graph into one or more packages, individual packages of the one or more packages including at least one code object identified within the dependency graph, wherein the code objects are grouped into the one or more packages based at least partly on an expected time to provision an execution environment on the on-demand code execution system with the one or more packages, and wherein the expected time to provision the execution environment is based at least partly on an expected caching of individual packages within the one or more packages on the on-demand code execution system and an expected time to transfer uncached packages of the one or more packages to the execution environment;
   generate the one or more packages;
   receive a request to execute the task on the on-demand code execution system; and
   execute the task on the on-demand code execution system at least partly by provisioning the execution environment of the on-demand code execution system with the one or more packages.

11. The non-transitory computer readable media of claim 10, wherein the dependency graph includes a plurality of nodes representing individual code objects, and wherein the dependency graph further includes edges between the plurality of nodes, the edges representing dependencies between the individual code objects.

12. The non-transitory computer readable media of claim 10, wherein generating the one or more packages comprises combining the code object included within the request with all code objects identified within the dependency graph as a dependency of the code object included within the request.

13. The non-transitory computer readable media of claim 10, wherein generating the one or more packages comprises combining the code object included within the request with only code objects identified within the dependency graph as a dependency of the code object included within the request and not a dependency of any other code object.

14. The non-transitory computer readable media of claim 10, wherein generating the one or more packages comprises combining the code object included within the request with all non-runtime code objects identified within the dependency graph as a dependency of the code object included within the request.

15. The non-transitory computer readable media of claim 10, wherein the one or more packages include plurality of packages, and wherein the computer-executable instructions further cause the processor to:
   determine that an execution metric of the task does not satisfy a threshold value; and
   determining a modification of the plurality of packages for the task expected to enable the execution metric to subsequently satisfy the threshold value; and
   modify the plurality of packages according to the determined modification.

16. The non-transitory computer readable media of claim 15, wherein the execution metric is based on historical executions of the task.

17. The non-transitory computer readable media of claim 10, wherein the at least one additional code object corresponds to at least one of source code or machine code.

* * * * *

UNITED STATES PATENT AND TRADEMARK OFFICE
CERTIFICATE OF CORRECTION

PATENT NO. : 10,564,946 B1  
APPLICATION NO. : 15/841143  
DATED : February 18, 2020  
INVENTOR(S) : Timothy Allen Wagner et al.

Page 1 of 1

It is certified that error appears in the above-identified patent and that said Letters Patent is hereby corrected as shown below:

On the Title Page

On Page 5, Column 1, Item (56), Line 55, under Other Publications, delete "064071dated" and insert --064071 dated--.

On Page 5, Column 2, Item (56), Line 29, under Other Publications, delete "WayBackMachine," and insert --Way Back Machine,--.

In the Specification

In Column 9, Lines 1-2, delete "computer executable" and insert --computer-executable--.

In Column 9, Lines 65-66, delete "computer executable" and insert --computer-executable--.

In Column 23, Line 49, delete "warmed'" and insert --warmed"--.

In Column 32, Line 53, delete "computer-readable" and insert --computer readable--.

In the Claims

In Column 35, Line 2, Claim 6, delete "the a" and insert --the--.

Signed and Sealed this  
Nineteenth Day of May, 2020

Andrei Iancu  
*Director of the United States Patent and Trademark Office*